United States Patent [19]
Hermanson et al.

[11] Patent Number: 5,405,461
[45] Date of Patent: Apr. 11, 1995

[54] METHOD OF PRODUCING HIGH STRENGTH SUCKER ROD COUPLING

[75] Inventors: Dean E. Hermanson, Richardson; Donald F. Hallden, Mesquite; Horace G. Isom, Rockwell, all of Tex.

[73] Assignee: Continental Emsco Company, Garland, Tex.

[21] Appl. No.: 225,160

[22] Filed: Apr. 8, 1994

Related U.S. Application Data

[63] Continuation of Ser. No. 992,179, Dec. 17, 1992, Pat. No. 5,334,268.

[51] Int. Cl.$^6$ .............................................. C21D 9/00
[52] U.S. Cl. ................................... 148/530; 148/400; 148/902
[58] Field of Search ......................... 148/530, 400, 902

[56] References Cited

U.S. PATENT DOCUMENTS

| | | | |
|---|---|---|---|
| 2,940,787 | 6/1960 | Goodner | 287/125 |
| 3,322,580 | 5/1967 | Haynes | 148/530 |
| 3,489,445 | 1/1970 | Kammerer | 287/117 |
| 3,831,259 | 8/1974 | Goulas | 29/428 |
| 4,003,669 | 1/1977 | Fenske et al. | 403/288 |
| 4,741,785 | 5/1988 | Welschof | 148/902 |
| 4,757,861 | 7/1988 | Klyne | 166/241 |
| 4,871,020 | 10/1989 | Rivas et al. | 166/241 |
| 4,905,760 | 3/1990 | Gray | 166/105 |
| 5,196,075 | 3/1993 | Jansen et al. | 148/530 |

FOREIGN PATENT DOCUMENTS

62-56525 3/1987 Japan.

OTHER PUBLICATIONS

Hanks, Richard W. Materials Engineering Science, Hartcourt, N.Y. p. 11-10 1970.
Dzhabarov, R. D., (English Abstract), Khim. Neft. Mashinostr. (1) 1987, 22-3 (Russsian).
LTV Energy Products, Production Equipment Division, DuraTech Products "LTV 'Premier Performance' Couplings With Ground Outside Diameters," *Oilfield Products, Engineering Products Bulletin* No. 1.1.3. 1990).

Primary Examiner—Upendra Roy
Attorney, Agent, or Firm—Arnold, White & Durkee

[57] ABSTRACT

A sucker rod coupling 10 having a high ultimate tensile strength, resistance to corrosion, and resistance to surface cracking arising out of a method of making the sucker rod coupling 10, which employs a five-step process of forming a coupling 10. First, a hollow cylindrical core 12 from a heat treatable steel is formed. Second, a thin coating 18 of metallic alloy is applied to the outer surface of the core 12. Third, the core 12 is heat treated. Fourth, threads 20 are partially cut in the inner surface of the core 12. Fifth, the threads 20 are cold worked to transform the partially cut threads 20 into finished threads 20 and to place the thread roots 22 in compression.

8 Claims, 1 Drawing Sheet

METHOD OF PRODUCING HIGH STRENGTH SUCKER ROD COUPLING

This application is a continuation of application Ser. No. 07/992,179, filed Dec. 17, 1992, now U.S. Pat. No. 5,334,268.

BACKGROUND OF THE INVENTION

1. Field of the Invention

The present invention relates generally to couplings used to connect pipe segments to form a string, and more particularly relates to couplings adapted to connect sucker rods together to form a sucker rod string for use in a producing well.

2. Description of the Related Art

Sucker rod couplings which connect individual sucker rods to form a string are a key component in the successful performance of a sucker rod string. By minimizing the wear breakage and corrosion of couplings, the life of the sucker rod string is increased, which can substantially decrease service and repair costs. However, sucker rod couplings can be the weakest link in the sucker rod string, limiting the amount of stress that the sucker rod string can absorb without failure.

The general industry practice has been to design sucker rod strings so that stress range requirements of the particular well application are within the allowable limits of the sucker rod body. This practice, however, erroneously assumes that the sucker rod couplings will provide the same or greater service life. This assumption is not valid for certain combinations of rods and couplings and results in derating the allowable coupling loads to give satisfactory coupling stress levels and corresponding service life.

Derating refers to the determination of the ultimate tensile strength of a particular coupling and sucker rod combination by multiplying the ultimate tensile strength of the sucker rod by a suitable derating factor. The derating factor normally has a value less than 1 and varies depending on the particular combination of coupling size and sucker rod size, and material strength.

There are two common situations involving derating. The first case involves the use of American Petroleum Institute (hereinafter "API") slimhole couplings with standard API or high strength grades of sucker rod. Although the ultimate tensile strength of the coupling and rod may be similar, the reduced wall thickness of slimhole couplings reduces the effective stress area thus creating an increase in stress in the coupling for any given load. For example, a typical derating factor for a 1 inch (approximately 0.025 m) diameter API slimhole coupling, when used with an API grade D sucker rod, is approximately 0.89. Thus, the combination of a 1 inch (approximately 0.025 m) diameter API slimhole coupling with an API grade D rod can typically withstand only about 89% of the stress that the API grade D rod could sustain alone.

The second scenario involves the use of a full-size API coupling with a high strength sucker rod which typically has an ultimate tensile strength in excess of 115,000 pounds per square inch (hereinafter "psi"). Here the ultimate tensile strength of the high strength sucker rod exceeds the ultimate tensile strength of the full-size API coupling. For example, a derating factor for a 7/8 inch nominal size (approximately 0.019 m) diameter full-size API coupling in combination with a high strength sucker rod is approximately 0.85. Thus, the combination of a 7/8 inch (approximately 0.019 m) full-size API coupling with a high strength sucker rod can withstand only about 85% of the stress that the high strength sucker rod could withstand alone.

Corrosive well environments further complicate the problem. Sour gas wells may cause sulfide cracking in coupling cores, or ordinary corrosion may cause the cores to fail. A thin nickel based metallic alloy is typically applied to the outer surface of a sucker rod coupling to protect the coupling from corrosion and sulfide cracking. However, such coatings are themselves susceptible to stress cracking when applied to coupling core materials that have a higher hardness and ultimate tensile strength, or when applied to a coupling core material that is to be heat treated. The surface coating tends to become brittle during the subsequent heat treatment.

Conventional fabrication techniques have failed to produce a sucker rod coupling of sufficient fatigue strength, ultimate tensile strength, and resistance to corrosion and surface cracking to allow operators to fully utilize the capability of existing sucker rods.

SUMMARY OF THE INVENTION

The present invention includes a new method for making a new sucker rod coupling which can match the fatigue and ultimate tensile strength of modern sucker rods while providing a crack and corrosion resistant coating. In a preferred embodiment, the high strength sucker rod coupling includes a cylindrical core which has an ultimate tensile strength in excess of about 146,000 psi and a Rockwell hardness (hereinafter HRC) in excess of about 32. A smooth coating surrounds the exterior of the cylindrical core. The coating has a hardness exceeding about 45 HRC and is designed to resist corrosion and wear. The cylindrical core also has a plurality of internal threads which are designed to engage the external threads of a typical sucker rod.

In another preferred embodiment adapted for mild well environments, the high strength sucker rod coupling includes a cylindrical core which has an ultimate tensile strength in excess of about 146,000 psi and a hardness in excess of about 32 HRC. The cylindrical core also has a plurality of internal threads which are designed to engage the external threads of a typical sucker rod.

The present invention also includes a new method of producing a high strength sucker rod coupling which entails forming or utilizing a hollow cylindrical core from a heat treatable steel, heating the core above about 1800° F., and adding a thin layer of metallic alloy to the core. The alloy preferably contains nickel, chromium, silicon, and iron. The core is then cooled slowly to below about 150° F. The core is then heat treated, salt quenched, and air cooled. The core is then tempered and tapped. The final step involves cold working the core threads to place the thread roots in a state of compression.

BRIEF DESCRIPTION OF THE DRAWINGS

Other objects and advantages of the invention will become apparent upon reading the following detailed description and reference to the drawing in which.

Figure 1:
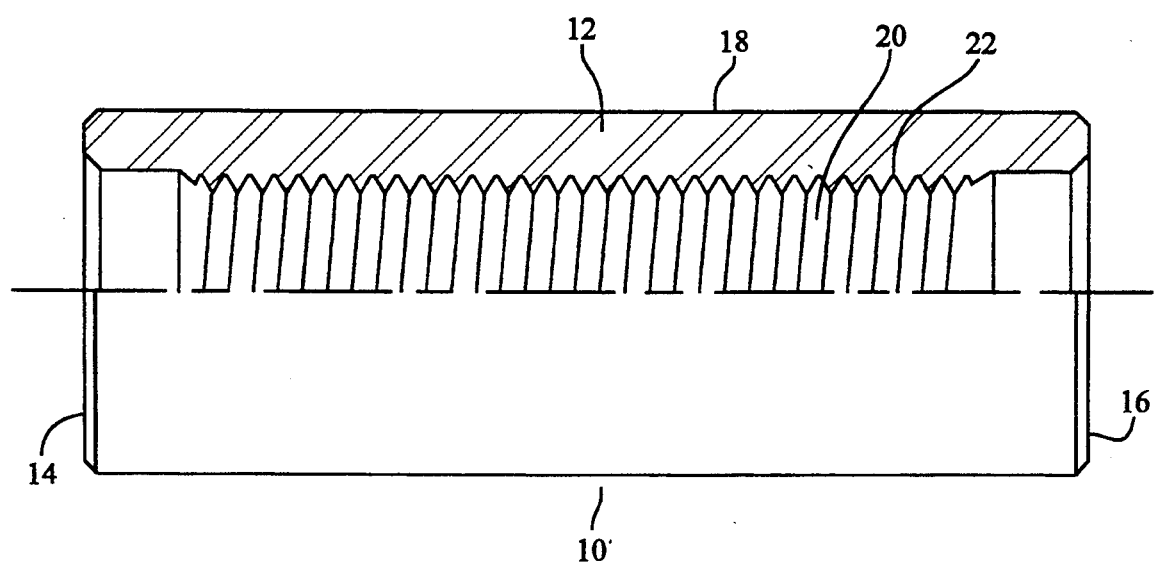
FIG. 1 depicts an exemplary high strength sucker rod coupling, illustrated in partial section.

While the invention is susceptible to various modifications and alternative forms, a specific embodiment thereof has been shown by way of example in the drawing and will therein be described in detail. It should be understood, however, that this specification is not intended to limit the particular form disclosed herein, but on the contrary, the invention is to cover all modifications equivalents, and alternatives falling within the spirit and scope of the invention, as defined by the appended claims.

DESCRIPTION OF THE PREFERRED EMBODIMENTS

Referring to FIG. 1, therein is depicted an exemplary high strength sucker rod coupling 10 in accordance with the present invention. The coupling 10 includes a core 12, end surfaces 14, 16, an external coating 18, and threads 20.

In a preferred embodiment, the core 12 is drawn into a hollowed substantially cylindrical form. The core 12 is preferably fashioned from AISI 4 140 or 4142 steel, though any steel capable of obtaining required strength/hardness through heat treatment may be suitable. After application of a suitable heat treatment, the core 12 preferably has a minimum ultimate tensile strength of approximately 117,000 psi and a hardness greater than about 23 HRC. It is especially preferred that the core 12 has a minimum ultimate tensile strength of about 146,000 psi and a minimum hardness of between about 32 and about 36 HRC. The end surfaces 14, 16 should be machined smooth by grinding or lapping or machining to ensure that any preload applied to the coupling 10 and the sucker rods is retained.

The coating 18 is preferably a nickel based alloy applied to the core 12 by a metal spray technique to be more fully disclosed below. In a particularly preferred embodiment, the coating 18 is composed of a minimum thickness of 0.010 inches (approximately 0.00025 m) of Colmonoy #5 spray powder, which contains nickel, chromium, silicon, and iron. Other coatings may be suitable as well such as SCM 76-M-50 (M) metal powder, or cobalt based powder which also contains iron, nickel, carbon, silicon, boron, chromium, and molybdenum. Other metal based powders, or other coatings, such as for example, ceramic or plastic coatings may be suitable as well, though plastic or other coatings which have a relatively low melting point will have to be applied after the core 12 is heat treated. The temperature at which the coating 18 is fused to the core 12 will depend upon the particular coating 18 material. The coating 18 preferably has a minimum hardness of between about 45 and about 53 HRC, but the hardness may be less than 45 HRC or exceed 53 HRC. To ensure that there is minimum friction and wear for both the coupling 10 and the well tubing through which it is inserted, the coating 18 should be ground to a smooth finish, or preferably, about 63 $R_a$.

Since the core 12 has a much higher hardness than lower strength cores, formation of the threads 20 in the core 12 requires a slightly different procedure than that conventionally used. Ordinarily, the threads 20 would be full-formed rolled in a cold working operation to place the roots 22 of the threads 20 in a state of compression and provide resistance to fatigue stress. However, owing to the hardness of the core 12, in this application the threads 20 should first be partially cut with an existing tap such that sufficient space remains in the thread roots 22 for metal displacement during a subsequent cold working operation. The threads 20, and particularly the thread roots 22, are then cold worked using a cold form tap to place the thread roots 22 in a state of compression. Experimentation has shown that by using this technique of forming the threads 20, the effect of the cold working extends to a depth of approximately 0.0030 inches (approximately 0.000076 m), which is approximately 75% of the cold working depth achieved on a lower strength coupling wherein the threads 20 are formed by the conventional full-formed rolling process.

In another embodiment more suitable for mild well environments, the sucker rod coupling does not have an external coating. In all other aspects, this embodiment of the sucker rod coupling is structurally identical to, and has the same physical properties as, the sucker rod coupling 10 shown in FIG. 1.

A preferred method for fabricating the sucker rod coupling 10 shown in FIG. 1 includes application of a suitable corrosion resistant coating 18 to the core 12, heat treating the coupling 10 to increase the ultimate tensile strength of the core 12 to above about 117,000 psi, and preferably above about 146,000 psi, and the core 12 hardness preferably above about 23 HRC to between about 32 and about 36 HRC, and forming the threads 20 by a combination of a partial tapping operation and a cold working operation.

Since the coating 18 should be able to withstand the heat treatment of the core 12 after the coating 18 is applied to the core 12, the spray metal technique for applying the coating 18 should be modified. Metal spray powder, preferably Colmonoy #5, is applied to the core 12 and fused between 1840° F. and 1860° F. The coating 18 formed thereby should have a minimum thickness of about 0.010 inches (approximately 0.00025 m) and have a minimum hardness between about 45 and about 53 HRC. It is preferred that immediately following application of the coating 18, the coupling 10 be slow cooled to prevent the formation of cracks in the coating 18. This is preferably done by immersing the coupling 10 in a suitable insulating material which will prevent rapid heat loss from the coupling 10 by either conduction, convection, or radiation. Experimentation has shown that Vermiculite in about ¼ inch (approximately 0.0064 m) granular size is particularly suitable as an insulating material. The coupling 10 should be cooled in the Vermiculite or other suitable material to below about 150° F. at a cooling rate not exceeding: about 41° F./min from about 1400° F. down to about 1200° F.; about 10° F./min from about 1200° F. to about 700° F.; and about 4° F./min from about 700° F. down to about 200° F., before removal from the Vermiculite or other material. After the coupling 10 is slow cooled, it should be checked for cracks in the coating 18 and the hardness of both the core 12 and the coating 18 should be checked.

Following application of the coating 18 to the core 12, the coupling 10 should be heat treated to increase the ultimate tensile strength of the core 12. Aside from achieving high ultimate tensile strength, the goal of the heat treatment is to create in combination with martensite grain structure with limited grain growth, such as bainitic in combination with martensite.

A preferable heat treatment, well known to those skilled in the art, comprises the following steps. The coupling 10 should be heated to about 900° F. and held at that temperature for about thirty minutes. The coupling 10 is then raised to between about 1200° F. to 1225° F. and held in that temperature range for about one hour. The coupling 10 is then heated to about 1550° F., held at that temperature for about one hour and simultaneously exposed to a 0.40 carbon potential. The coupling 10 is next quenched in salt at about 525° F. and held at that temperature for about one hour. The coupling 10 is then air cooled to below about 150° F. and the core 12 hardness is again checked. The core 12 should then be tempered to achieve a hardness of between about 32 and about 36 HRC.

Following heat treatment, the threads 20 are formed in the core 12 by a combination of cutting and cold working. The threads 20 are first partially cut by a suitable tap which will leave space at the thread roots 22 for metal displacement during a subsequent cold working operation.

Threads may be formed in a conventional lower strength sucker rod coupling by a pure full-formed rolling operation which does not remove any material from the coupling but rather displaces it, particularly at the roots, thus increasing the fatigue strength at the roots. However, because the ultimate tensile strength of the core 12, in accordance with the present invention, is substantially greater than about 100,000 psi, the core 12 is simply too hard for a pure cold working operation to form the threads 20 therein.

After the threads 20 have been partially tapped, they should be cold worked using a cold form tap to displace, but not remove, some material at the thread roots 22, with the goal of placing the thread roots 22 in a state of compression to give the thread roots 22 a heightened resistance to fatigue stress cracking. For example, experimentation has shown that a 1 inch nominal size (approximately 0.025 m) sucker rod coupling 10 in accordance with the present invention has endured about $10^7$ cycles of a stress load alternating between about 13,006 psi to about 54,904 psi without failure.

Subsequent to the cold working of the threads 20, the end surfaces 14, 16 should be machined smooth and perpendicular to the threads 20 to minimize bending moment on the threads 20, and to preserve any preload that may be placed on the coupling 10 after rod insertion. In addition, the coating 18 should be ground to a smoothness of a 63 $R_a$ finish to minimize friction and wear for both the coupling 10 and the particular tubing through which the coupling 10 is inserted.

For mild well environments, the above method need not include the spray metal application. The strength and hardness of the core 12 and the threads 20 may be increased using either the heat treatment and subsequent threading operation disclosed above or by using a pure full-formed rolling operation to achieve a prefered ultimate tensile strength of approximately 117,000 psi and a core hardness of at least 23 HRC.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention.

We claim:

1. A method of making a sucker rod coupling, said method comprising the steps of:

producing a hollow cylindrical core having an inner surface and an outer surface, said core having a Rockwell hardness of greater than 23 HRC and said outer surface having a Rockwell hardness greater than said Rockwell hardness of said core;

cutting partial threads in said inner surface of said core, said partial threads having roots; and cold working said partial threads to transform said partial threads into finished threads and to place said roots in compression.

2. The method, as set forth in claim 1, wherein said step of producing comprises the step of:

increasing said Rockwell hardness of said outer surface to at least 45 HRC.

3. The method, as set forth in claim 1, wherein said step of producing comprises the steps of:

applying a metallic coating to said outer surface of said core, said metallic coating having a Rockwell hardness of at least 45 HRC; and heat treating said core and said metallic coating to fuse said metallic coating to said core and to fix said Rockwell hardness of said core at a Rockwell hardness of greater than 23 HRC and less than or equal to 36 HRC.

4. The method, as set forth in claim 2, wherein said step of increasing comprises the step of:

applying a coating to said outer surface, said coating having a Rockwell hardness of at least 45 HRC.

5. A method of making a sucker rod coupling, said method comprising the steps of:

producing a hollow cylindrical core having an inner surface and an outer surface, said core having a tensile strength of at least 117,000 pounds per square inch and said core having a first Rockwell hardness and said outer surface of said core having a second Rockwell hardness, said second Rockwell hardness being greater than said first Rockwell hardness;

cutting partial threads in said inner surface of said core, said partial threads having roots; and cold working said partial threads to transform said partial threads into finished threads and to place said roots in compression.

6. The method, as set forth in claim 5, wherein said step of producing comprises the step of:

increasing said Rockwell hardness of said outer surface to at least 45 HRC.

7. The method, as set forth in claim 5, wherein said step of producing comprises the steps of:

applying a metallic coating to said outer surface of said core, said metallic coating having a Rockwell hardness of at least 45 HRC; and heat treating said core and said metallic coating to fuse said metallic coating to said core and to fix said Rockwell hardness of said core at a Rockwell hardness of greater than 23 HRC and less than or equal to 36 HRC.

8. The method, as set forth in claim 6, wherein said step of increasing comprises the step of:

applying a coating to said outer surface, said coating having a Rockwell hardness of at least 45 HRC.

* * * * *